United States Patent [19]
Pao-Seng

[11] Patent Number: 5,452,651
[45] Date of Patent: Sep. 26, 1995

[54] AUTOMATIC MUNGBEAN SPROUT HULLING AND ROOT CUTTING APPARATUS

[75] Inventor: Lin Pao-Seng, Yung Ho City, Taiwan

[73] Assignee: Boss Bean Sprout Group of Company Ltd., Taipei, Taiwan

[21] Appl. No.: 375,422

[22] Filed: Jan. 18, 1995

[51] Int. Cl.⁶ ............................ A47J 17/06; A01D 45/22
[52] U.S. Cl. ................... 99/546; 99/540; 99/636; 99/639
[58] Field of Search .............. 99/540, 546, 541–545, 99/518, 519, 635–643; 47/58–62, 14, 16; 426/63, 64, 302, 589, 634

[56] References Cited

U.S. PATENT DOCUMENTS

| | | | |
|---|---|---|---|
| 1,897,664 | 2/1933 | Hansen | 99/636 |
| 2,770,274 | 11/1956 | Mencacci | 99/639 |
| 3,731,797 | 5/1973 | Tanner | 99/567 |
| 3,768,201 | 10/1973 | Yoo | 47/16 |
| 4,144,671 | 3/1979 | Lee | 47/61 |
| 4,223,688 | 9/1980 | Nylund et al. | 99/567 |
| 4,465,696 | 8/1984 | Strahl | 426/589 |
| 4,572,063 | 2/1986 | Yamamoto | 99/524 |
| 4,577,552 | 3/1986 | Yamamoto | 99/528 |
| 4,751,974 | 6/1988 | Kawakami | 177/114 |
| 4,773,323 | 9/1988 | Frasch et al. | 99/609 |
| 4,981,073 | 1/1991 | Zittel | 99/643 |

Primary Examiner—Timothy F. Simone
Attorney, Agent, or Firm—W. Wayne Liauh

[57] ABSTRACT

An automatic mungbean sprout hulling and root-cutting apparatus includes a case which has a bean sprout inlet chute to receive bean sprouts transmitted by a conveyer of a transmission means. Bean sprouts then fall upon an inclined screen and are discharged out through a bean exhaust chute. An air ventilation means is disposed at the bottom of the case to send forced air pass through the reclined screen and to blow away light-weight bean hull from bean sprout. Bean hulls are discharged out through a bean hull exhaust exit. Bean sprouts fall on the screen by gravity force. The apertures on the screen can facilitate root-cutting function. Thus to serve the purpose of bean sprout hulling and root-cutting purpose. A screen vibration means can also be employed to further enhance the hulling and root-cutting effect.

6 Claims, 6 Drawing Sheets

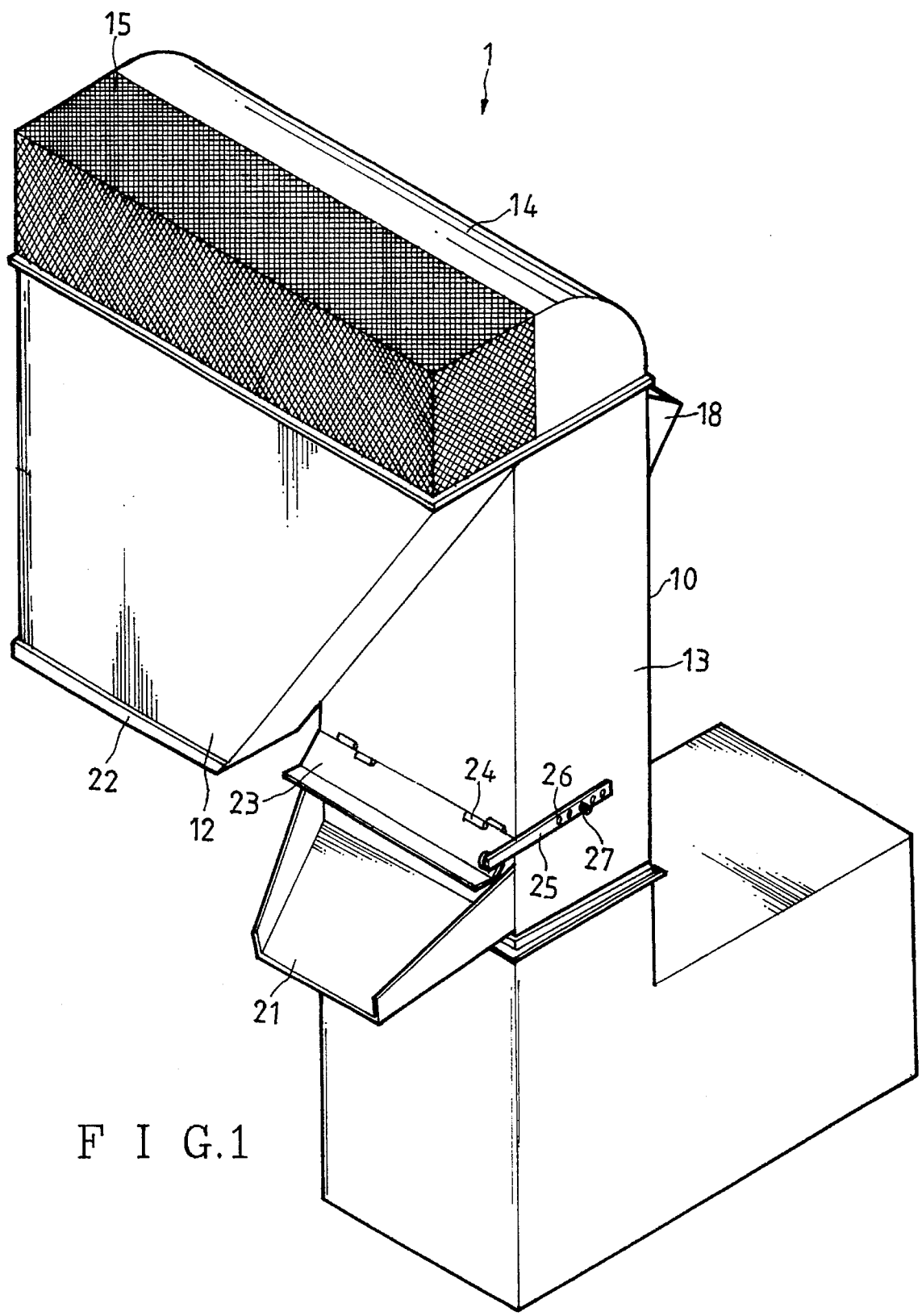
F I G.1

AUTOMATIC MUNGBEAN SPROUT HULLING AND ROOT CUTTING APPARATUS

BACKGROUND OF THE INVENTION

Quality control of bean sprout starts from proper seed selection. Proper seed selection means to choose seeds of pure quality, healthy and diseases face, such that the grown up sprout can be bountiful. Most important, the sprout would be root-short, stem-big, taste-good, strong and have good appearance and can last long time storage, proper cultivating technique and processing skill are also very important.

Nowadays computer controlled automatic bean sprout production process almost replace traditional production means of manual spraying in water pail cultivating or wooden pail cultivating method. Conventional bean sprout production procedures include initial steps of seed selection, sifting, water-stepping, then proceed cultivating procedures of budding and growing. After the sprout is fully grown, it is harvested. Then the processes of hulling, root-cutting, cleansing and packaging are performed to complete the whole process.

Conventional sprout hulling and root-cutting processes usually has a water through to contain sprout. Flowing water and rotary dram are used to carry sprout in the water. Most beam hulls sink at the bottom of water through; some would float on water surface. A filter is employed to collect and discharge bean hull and to separate sprout from hull. During sprout being carried in water flow, a rotary rake is used to chop off the root of sprout. However conventional processes set forth above cannot perform hulling and root-cutting function with satisfactory results. Furthermore it is labor intensive, and consume much water and electric power, and result in energy waste. In addition, when sprout being carried in water flow, the sprout easily get spoiled and cannot sustain long storage time.

SUMMARY OF THE INVENTION

The present invention relates to an automatic mungbean sprout hulling and root cutting apparatus. The apparatus includes a case with a sprout inlet chute disposed on an upper side. Bean sprout is carried and dumped into the sprout inlet chute by a conveyer transmission means. The sprouts then slide down through reclined screens and are discharged out through a sprout exhaust chute. At the bottom of the case, there is an air ventilation means to send forced air upward and pass through the screen and the sprout thereupon, thereby to carry away the light-weight sprout hull upward and discharge the sprout hull out of the case through a hull exhaust duct.

The primary object of the present invention is to provide an automatic mungbean sprout hulling and root-cutting apparatus which has air ventilation means to send forced air into a case to blow away the light weight hull from the sprout and to discharge the hull out of the case through a sprout exhaust chute. As the sprout hull is separated from the sprout by forced air, do not need water-steeping, there is not water spoiling on the sprout. In addition, it has the advantages of saving water, electric power and labors.

Another object of the present invention is to provide an automatic mungbean sprout hulling and root-cutting apparatus which has a screening mean disposed within the case. An upper and an lower screens are overlapped and disposed between the sprout inlet chute and sprout exhaust chute. The screens are disposed at an inclined angle, thus there is a falling distance between sprout inlet chute and sprout chute. The sprout, when falling down from inlet chute and on the screens, the long thin root would insert into the screen apertures and being cut off and discharged out. The hulling and root-cutting process of the present invention is applying gravity force, therefore has the advantages of saving water, electric power and labors.

BRIEF DESCRIPTION OF THE DRAWINGS

FIG. 1 is a perspective view of the present invention.

DETAILED DESCRIPTION

Figure 2:
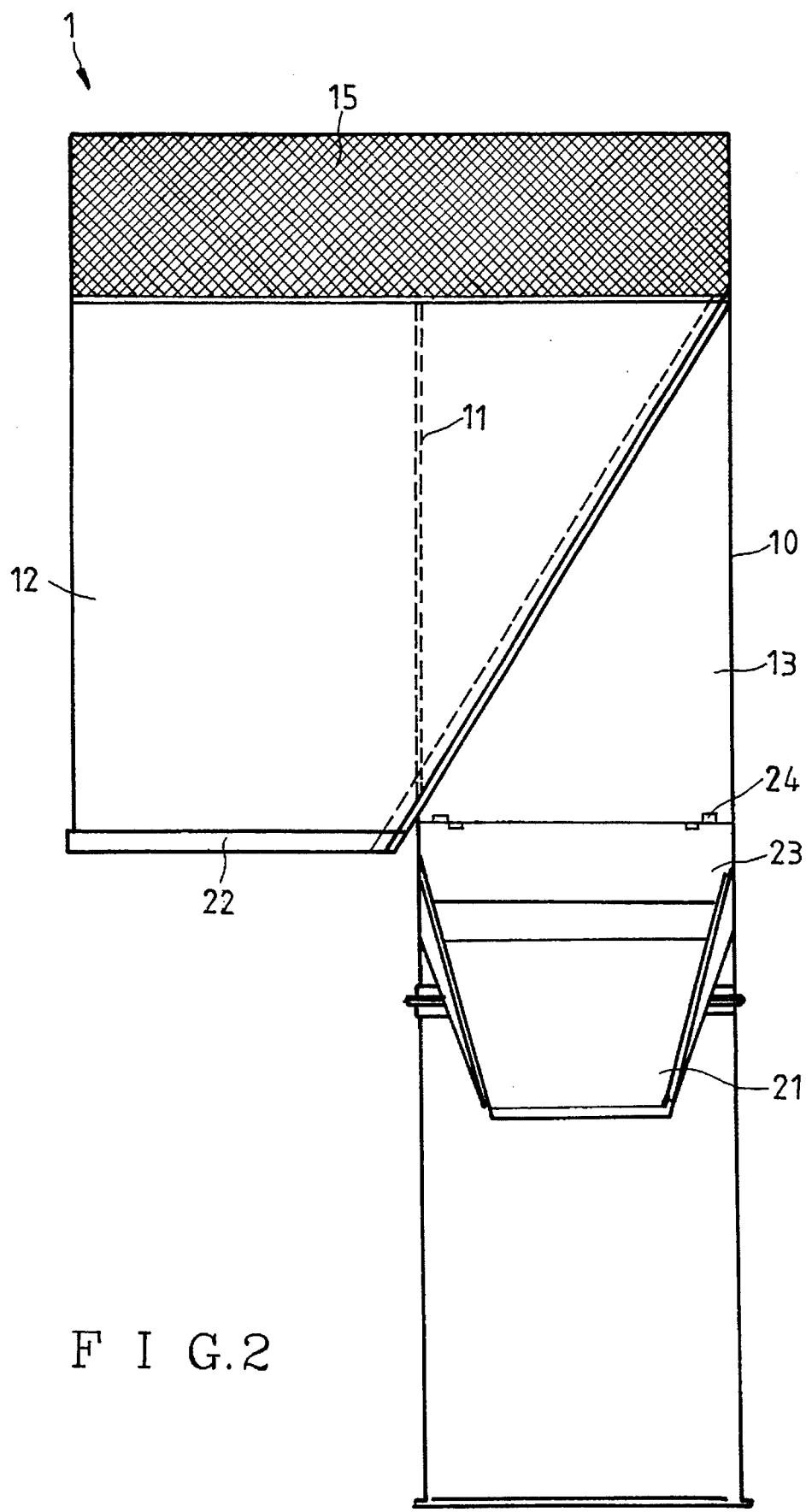
FIG. 2 is an elevation view of the present invention.
Figure 3:
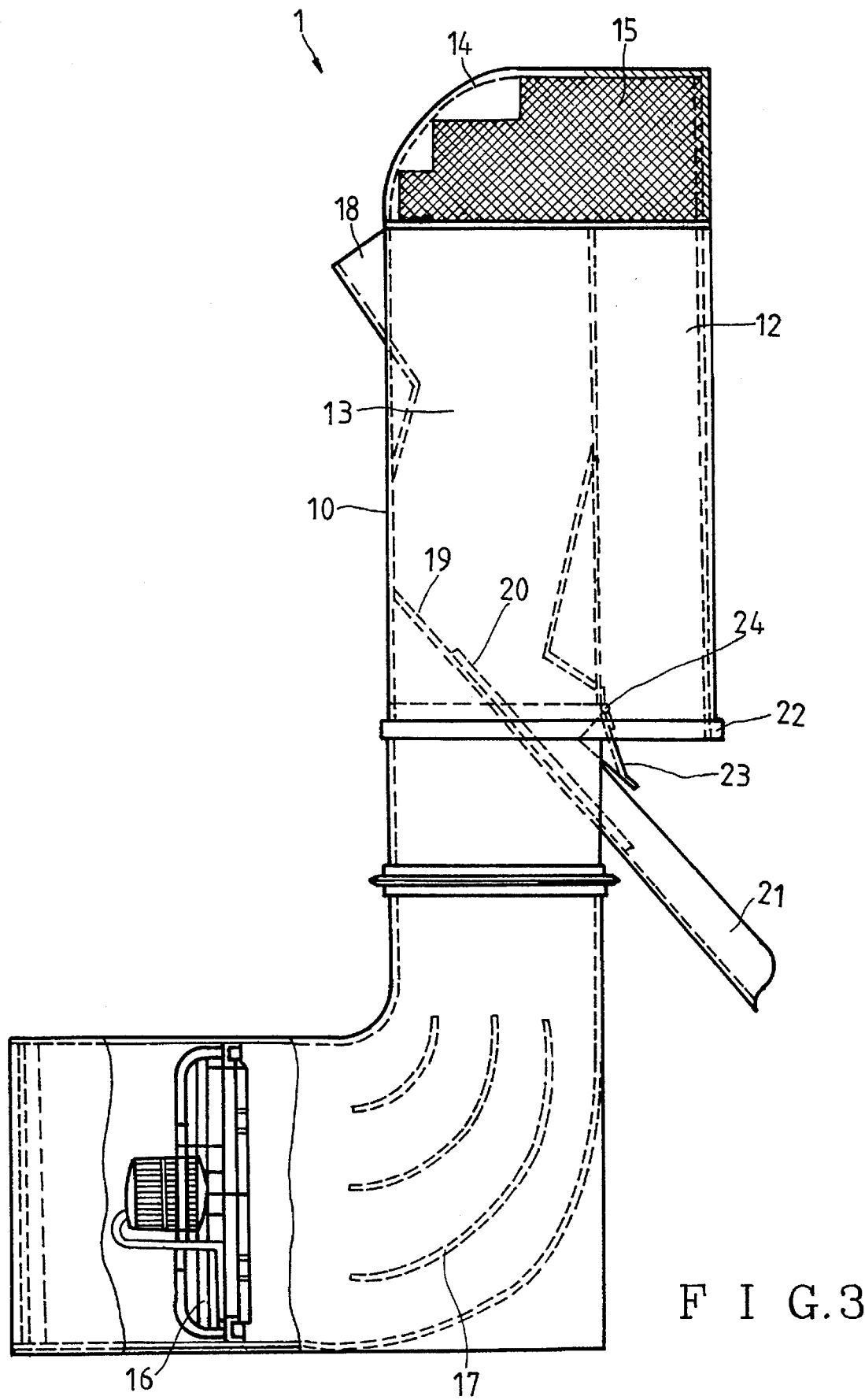
FIG. 3 is a side view of the present invention.

Referring to FIG. 1, 2 and 3, the hulling and root-cutting apparatus of the present invention composes mainly of a case (10) which is a hollow shell type structure at a proper height. A vertical partition (11) is disposed inside the case (10) to form a bean hull exhaust duct (12) on the left and an air duct (13) on the right. Partition (11) does not fully extend to the top of the case (10). Thus there is a free passage at the top portion of the case between air duct (13) and exhaust duct (12). There is a curved and closed deflector (14) disposed on the rear side of the top of case (10). An air discharge screen (15) is disposed on the from side at the top of case (10). An air ventilation means (16) is disposed on the rear side at the bottom of air duct (13). An opening is formed in case (10) behind air ventilation means (16) to allow fresh air to flow into air duct. A plural number of parallelly spaced air flowing guides (17) are disposed in front of air ventilation means (16) to channel the forced air into air duct (13). The forced air flow from bottom to top of air duct (13). Some of air discharge out through air discharge screen (15). Some other air hit deflector (14) then mm to the left and discharge out through hull exhaust duct (12).

Figure 4:
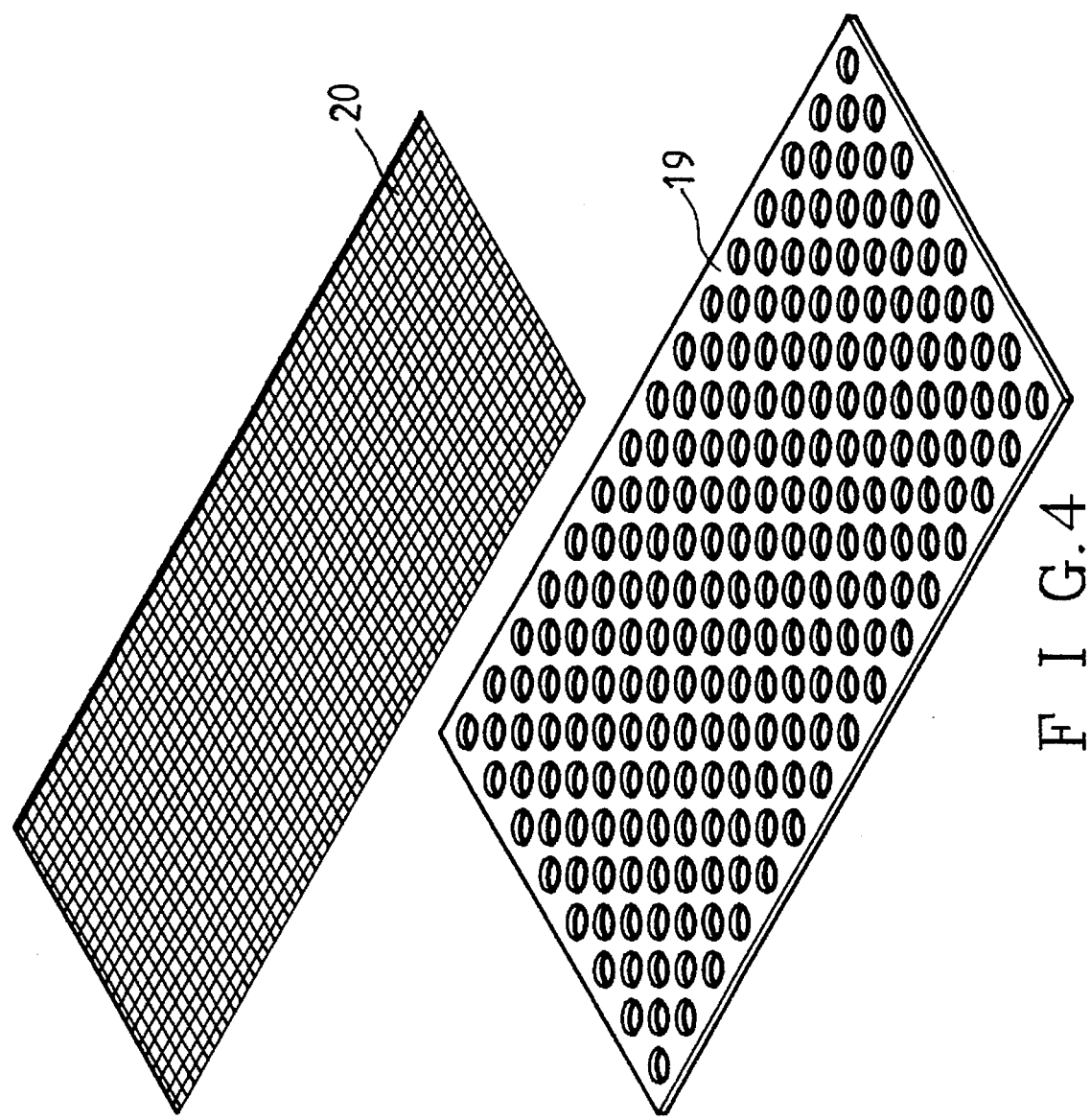
FIG. 4 is a perspective view of the screens of the present invention.

There is a sprout inlet chute (18) disposed at the rear side of case (10) and on the upper section of air duct (13). Two screens (19), (20) are disposed at a inclined angle across air duct (13) and are below sprout inlet chute (18), and connect with a sprout exhaust chute (21). Referring to FIG. 4, screen (19) has larger apertures while screen (20) is shorter than screen (19) and has smaller apertures. Screen (20) is disposed on the top of screen (19) and has its lower end aligning with the lower end of screen (19), thus forming a non-overlap section on the rear and upper portion of screen (19). Thereby forced air passing through the rear portion of screen (19) would have larger amount of air flow than that in the front portion where screen (19) overlaps with screen (20). Screen (19) and (20) extend downward at the from end to form a ⌴ shape crosssection at sprout exhaust chute (21) which is connected with case (10). Sprout exhaust chute (21) protrudes from case (10) at an inclined angle. Thus sprout inlet chute (18), first screen (19), second screen (20) and sprout exhaust chute (21) form a sprout transmission channel which interest with air duct (13) at an inclined angle.

Case (10) has a hull exhaust duct (12) on the left and an air duct (13) on the right with a partition (11) disposed in the middle. Partition (11) does not reach the top of the case (10). There is a free passage above partition (11) to allow air to flow. Thus air ventilation means (16) delivers forced air from bottom of air duct (13) upward, some of air pass through air discharge screen (15), some deflector (14), then turn to the left and flow into hull exhaust duct from top and moving downward, and discharge out through hull exhaust exit (22).

Above bean sprout exhaust chute (21) which is disposed on the right side of air duct (13), there is a disturbing cover (23) which is connected to case (10) by hinge (24). Disturbing cover (23) can be swung open to control the opening degree of bean sprout exhaust chute (21). When disturbing cover (23) is swung open to a larger degree, bean sprout exhaust chute (21) also open to a larger degree, and vice versa. It is to serve as an auxiliary control means to control the air velocity and air volume in air duct (13). Disturbing cover (23) engages with a from end of linkage bar (25). Linkage bar (25) has a plural number of adjusting openings (26) disposed on another end. A fastener (27) is used to fix one of the adjusting openings (26) on a side wall of case (10), thereby disturbing cover (23) can be moved open to a large or small degree as needed.

Figure 5:
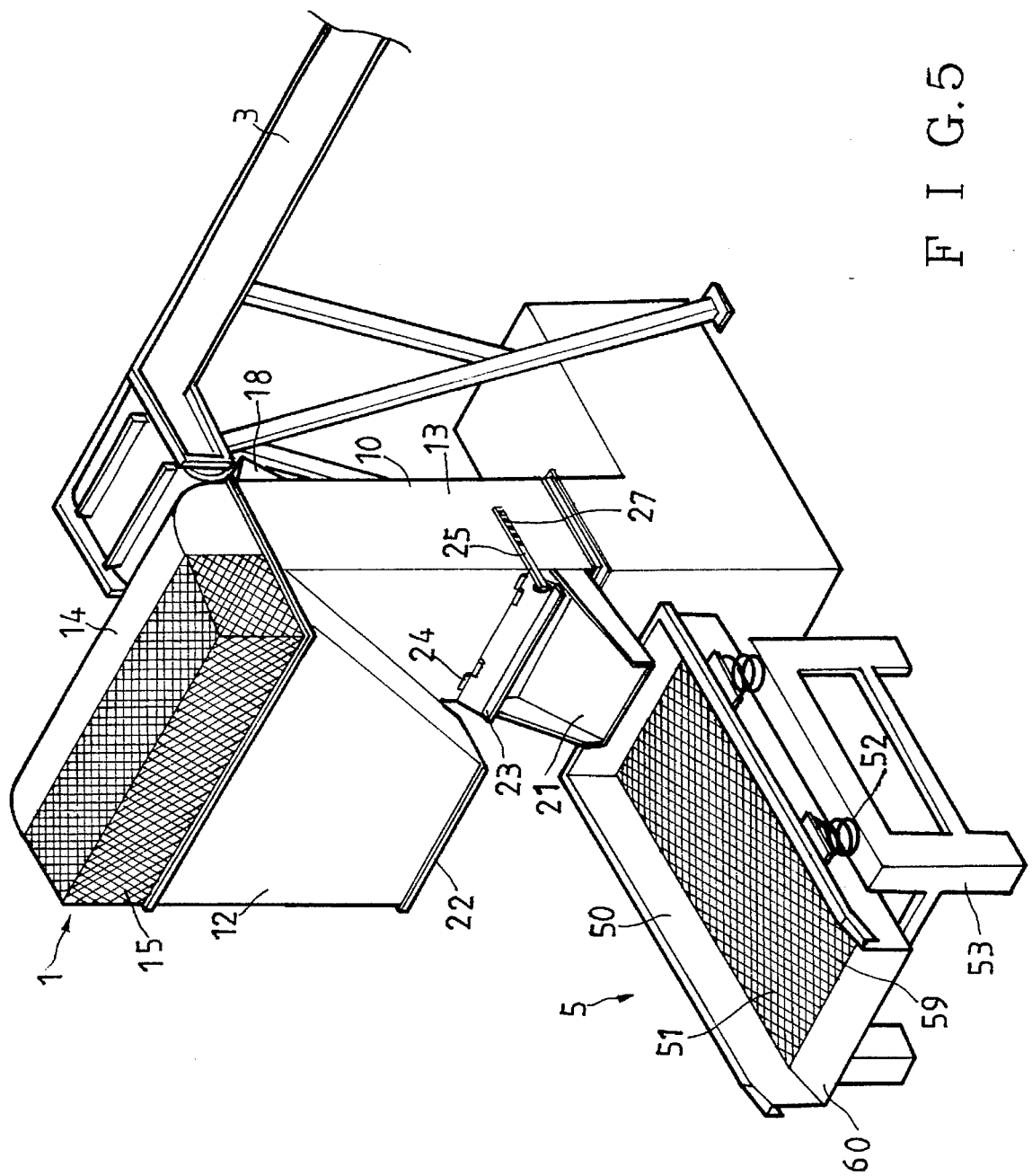
FIG. 5 is a pictorial view of the present invention coupled with a transmission means and a vibration means.

FIG. 5 illustrates a pictorial view of the present invention in operation status. Air ventilation means (16) is started first, and is maintained at proper rotation speed. Then a conveyer belt (3) of transmission means carries the unprocessed bean sprouts to a bean sprout hulling and root-cutting apparatus of the present invention. Bean sprouts are damped into case (10) through bean sprout inlet (18). Bean sprouts fall upon screens (19), (20) due to gravity force. Since there is no overlap between screen (19) and (20) at the rear section, and screen (19) has bigger apertures than screen (20), forced air blowing from air ventilation means (16) thus form larger air flow volume at the near side than that at the front side. Bean sprout falling on screens (19), (20) would be blown and carried to the front section of screen (20). The falling of bean sprout by gravity force on the inclined screen (20) produce the first natural root-cutting process.

Furthermore, as screen (20) has smaller apertures, bean sprout cannot totally passes through an aperture, only root section of bean sprout would insert into aperture, thus producing the second root cutting process. Bean sprout which lost its root would then be blown upward by forced air coming from air ventilation means (16). Light weight bean hulls are blown upward to separate from bean sprout. Bean sprout is heavier and is falling on the inclined screens (19), (20) and slides downward to sprout exhaust chute (21) and be discharged out. Bean sprout after being processed by the bean sprout hulling and root-cutting apparatus of the present invention has achieved the objectives of hulling and root-cutting. Bean hulls and roots being cut off are blown upward in air duct (13) and being carried to hull exhaust duct (12), then are discharged out through hull exhaust exit (22) for further process.

Figure 6:
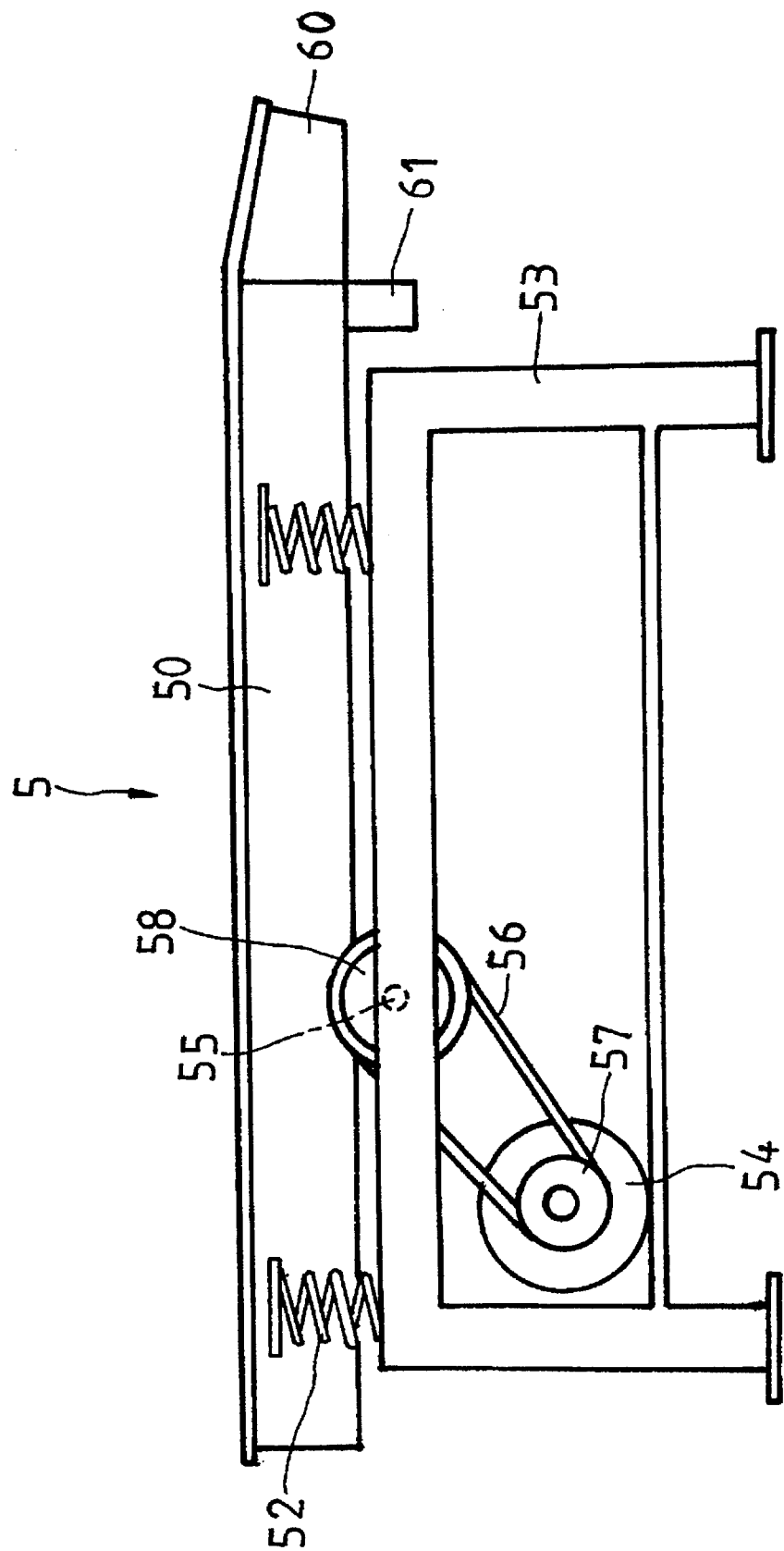
FIG. 6 is a side view of a vibration means.

Bean sprouts lose about 85% of the hulls and most of roots after being processed by bean sprout hulling and root-cutting apparatus of the present invention. If there is a need to increase the hulling and root-cutting efficiency, it can be achieved by disposing a high speed vibration means (5) below sprout exhaust chute (21). The vibration means has a trough (50). A rear end of through (50) is disposed under sprout exhaust chute (21). A front end of trough (50) has an open discharge exit (60) and has an inclined angle. Trough (50) has two levels. Upper level is a sitting screen (51), lower level is a closed frame. Trough (50) is supported by four springs (52) which are disposed on a base frame (53). Base frame (53) is the base to support and to link related elements. Base frame (53) has a motor (54) disposed thereon (referring to FIG. 6). There is an eccentric spindle (55) disposed on the surface of trough (50). Motor (54) and eccentric spindle (55) are linked by a transmission means composing of a belt (56) and pulleys (57), (58) to eccentric spindle (55) which drives through (50) to generate high speed vibration. Bean sprout, after falling on sifting screen (51), would be carried forward due to vibration of trough (50). Sifting screen further severs to separate hull from the sprout and to cut off the remaining sprout roots. Sprout is then discharged out through discharge exit (60). By combining vibration means (5) and bean hulling root-cutting apparatus (1), about 98% of bean hulls and 90% of bean roots will be removed. Bean hulls and roots being removed by sifting screen (51) are discharged out through another exhaust exit (61).

The present invention is automatic operation, thus can effectively save labors. It does not use water during process, thus can save huge amount of water. It takes only forced air during operation, thus can save a great deal of electricity. As no water is used during process, there is no water spoil of sprout, and making bean sprout can last longer storage time.

I claim:

1. An automatic mungbean sprout hulling and root-cutting apparatus comprising:

a case having a bean sprout inlet chute and a bean sprout exhaust chute, said bean sprout exhaust chute being disposed below said bean sprout inlet chute, said case also having an inclined screen disposed between said bean sprout inlet chute and said bean sprout exhaust chute to form a sprout transmission channel; said case having an air discharge screen disposed on the top said case further having a partition disposed vertically inside to form a hull exhaust duct and an air duct, said hull exhaust duct and said air duct forms a free passage at the top of said partition, said air duct having an air ventilation means disposed at the bottom to generate forced air to flow upward and run across said inclined screen, some of said forced air being discharged out through said air discharge screen, some other said forced air being turned and flow to said hull exhaust duct, said hull exhaust duct forms a hull exhaust exit below its exhaust duct opening; and a transmission means having a conveyer belt to carry beans sprout to said bean sprout inlet chute and to dump said bean sprout into said case, said bean sprout falls onto said inclined screen to generate a first root-cutting process, said bean sprout further having its root inserted into apertures of said inclined screen for another root-cutting process, said force air blowing upward to carry bean hull to said hull exhaust duct and to discharge out through said hull exhaust exit.

2. An apparatus of claim 1 whereto said inclined screen having a first screen of large apertures and a second screen of small apertures, said second screen is shorter than first screen, said first screen and said second screen overlap with each other and forming an non-overlap portion at one end.

3. An apparatus of claim 1 wherein said bean sprout exhaust chute having a disturbing cover disposed above its opening to control opening degree of said bean sprout exhaust chute.

4. An apparatus of claim 1 further having a high speed vibration means disposed below said bean sprout exhaust chute, said vibration means having a trough, one end of said trough forms an open sprout exit, said trough being supported by springs on a base frame, said trough is driven to vibrate by an eccentric spindle, said trough further having a screen to sift said bean sprout and to facilitate further root-cutting of said bean sprout, said trough screen having a bean hull and root-discharge exit.

5. An apparatus of claim 3 wherein said disturbing cover is connected with said case by hinges, said disturbing cover further connects with a linkage bar, said linkage bar having a plural number of adjusting openings disposed thereon, said linkage bar can fixed on said case by wing a faster to fix into one of said adjusting opening.

6. An apparatus of claim 1 wherein said air ventilation means having a plural number of parallelly spaced air flowing guides disposed in the front to channel forced air to said air duct.

* * * * *